United States Patent
Soans et al.

(10) Patent No.: US 12,488,556 B2
(45) Date of Patent: Dec. 2, 2025

(54) METHOD AND ELECTRONIC DEVICE FOR PROCESSING INPUT FRAME FOR ON-DEVICE AI MODEL

(71) Applicant: Samsung Electronics Co., Ltd., Suwon-si (KR)

(72) Inventors: Rajath Elias Soans, Bengaluru (IN); Pradeep Nelahonne Shivamurthappa, Mahadevapura (IN); Kuladeep Marupalli, Bengaluru (IN); Alladi Ashok Kumar Senapati, Bangalore (IN); Ananya Paul, Katihar (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 18/172,774

(22) Filed: Feb. 22, 2023

(65) Prior Publication Data

US 2023/0252756 A1     Aug. 10, 2023

Related U.S. Application Data

(63) Continuation of application No. PCT/KR2023/001787, filed on Feb. 8, 2023.

(30) Foreign Application Priority Data

Feb. 8, 2022   (IN) .............................. 202241006791

(51) Int. Cl.
*G06V 10/26*       (2022.01)
*G06V 10/25*       (2022.01)
*G06V 10/82*       (2022.01)

(52) U.S. Cl.
CPC ............ *G06V 10/267* (2022.01); *G06V 10/25* (2022.01); *G06V 10/82* (2022.01)

(58) Field of Classification Search
CPC ...... G06V 10/267; G06V 10/25; G06V 10/82; G06V 2201/07; G06V 10/764; G06T 3/40;

(Continued)

(56) References Cited

U.S. PATENT DOCUMENTS 10,176,551 B2    1/2019  Park et al.
10,325,179 B1    6/2019  Kim et al.
(Continued)

FOREIGN PATENT DOCUMENTS

KR    10-2020-0063303 A    6/2020
KR    10-2021-0042275 A    4/2021
WO         2021-003938 A1    1/2021

OTHER PUBLICATIONS

Amirhossein Habibian et al. Skip-Convolutions for Efficient Video Processing, Proceedings of the IEEE/CVF Conference on Computer Vision and Pattern Recognition 2021, Apr. 23, 2021.

(Continued)

*Primary Examiner* — Andrew M Moyer
*Assistant Examiner* — Ahmed A Nasher
(74) *Attorney, Agent, or Firm* — Jefferson IP Law, LLP

(57) ABSTRACT

A method for processing an input frame for an on-device AI model is provided. The method may include obtaining an input frame. The method may include building at least one kernel independent of the scale of the input frame by passing input variables to the at least one kernel using preprocessor directives independent of the scale of the input frame. The method may include inputting the input frame to the on-device AI model including the at least one kernel independent of the scale of the input frame. The method may include processing the input frame in the on-device AI model.

17 Claims, 14 Drawing Sheets

(58) Field of Classification Search
CPC .......... G06T 2207/10016; G06T 7/194; G06T 2207/20104; G06T 7/11; G06T 2210/22
See application file for complete search history.

(56) References Cited

U.S. PATENT DOCUMENTS

| | | | |
|---|---|---|---|
| 11,556,183 B1* | 1/2023 | Li | G06V 40/107 |
| 2020/0126205 A1 | 4/2020 | Liu et al. | |
| 2020/0160096 A1 | 5/2020 | Lee et al. | |
| 2020/0401871 A1 | 12/2020 | Tseng | |
| 2021/0027471 A1* | 1/2021 | Cohen | G06T 7/90 |
| 2021/0142086 A1 | 5/2021 | Berkovich et al. | |
| 2021/0279929 A1* | 9/2021 | Murray | G06T 7/10 |
| 2021/0365707 A1* | 11/2021 | Mao | G06V 20/46 |
| 2023/0237671 A1* | 7/2023 | Khinvasara | G06V 10/80 |
| | | | 382/104 |

OTHER PUBLICATIONS

Shahriar Akramullah, Digital Video Compression Techniques, Digital Video Concepts, Methods, and Metrics, Apress, Berkeley, CA, 2014. 11-54.

Moore et al., Kernel Specialization for Improved Adaptability and Performance on Graphics Processing Units (GPUs), 2013 IEEE 27th International Symposium on Parallel & Distributed Processing.

International Search Report dated May 22, 2023, issued in International Patent Application No. PCT/KR2023/001787.

Mun-Su, Lee et al., Trends in Low-Power On-Device Vision SW Framework Technology, ETRI Electronics and Telecommunications Trends, vol. 36, No. 2, pp. 56-64, Apr. 1, 2021.

Sauptik Dhar et al., On-Device Machine Learning: An Algorithms and Learning Theory Perspective, arXiv:1911.00623 vol. 1, pp. 1-36, Nov. 2, 2019.

Indian Office Action dated Mar. 3, 2025, issued in an Indian Patent Application No. 202241006791.

* cited by examiner

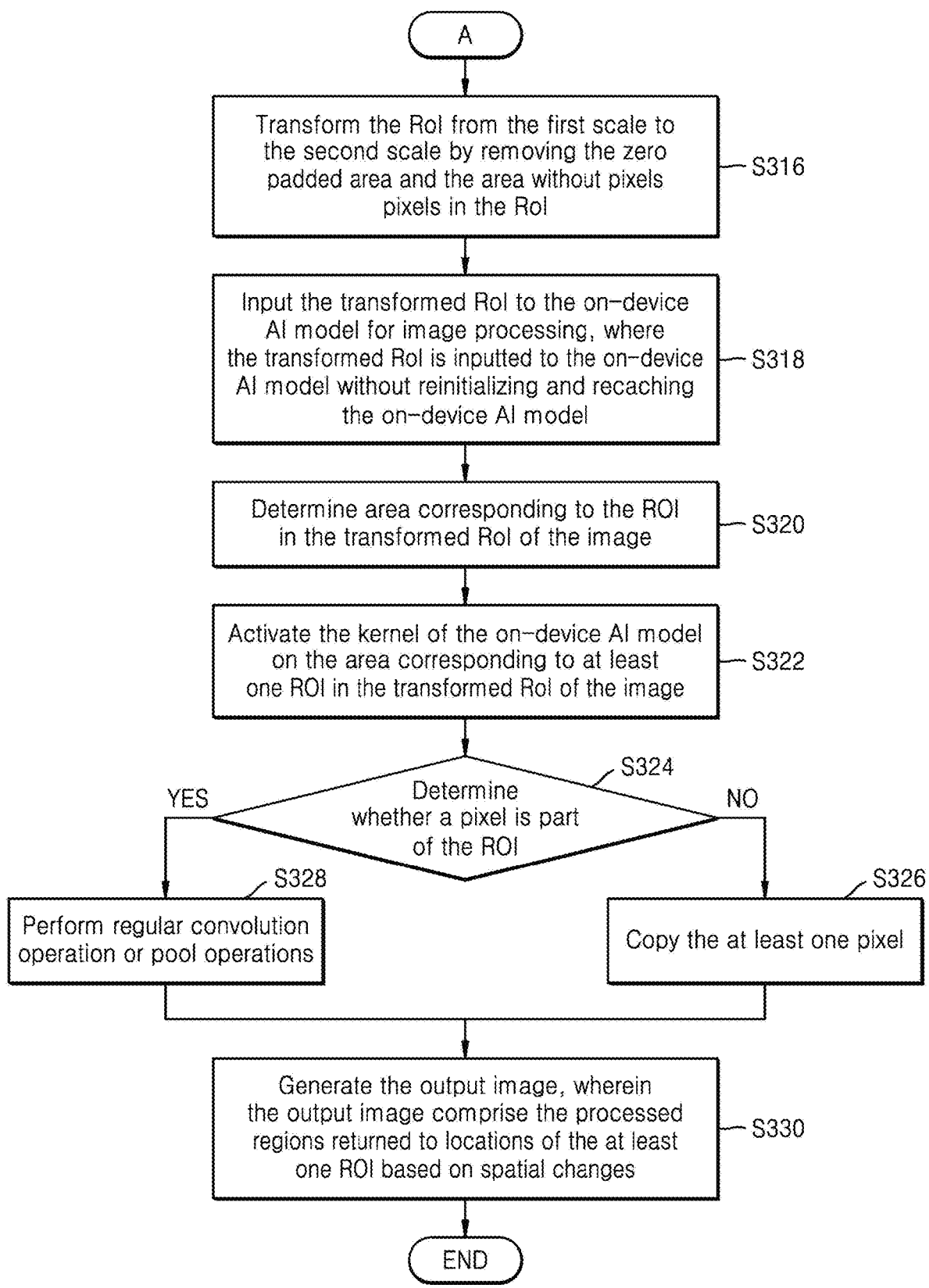

METHOD AND ELECTRONIC DEVICE FOR PROCESSING INPUT FRAME FOR ON-DEVICE AI MODEL

CROSS-REFERENCE TO RELATED APPLICATION(S)

This application is a continuation application, claiming priority under §365(c), of an International application No. PCT/KR2023/001787, filed on Feb. 8, 2023, which is based on and claims the benefit of an Indian patent application number 202241006791, filed on Feb. 8, 2022, in the Indian Patent Office, the disclosure of which is incorporated by reference in its entirety.

FIELD OF INVENTION

The disclosure relates to an image processing method. More particularly, the disclosure relates to a method and an electronic device for in-place transformation of an input image for an on-device artificial intelligence (AI) model by the electronic device.

BACKGROUND OF INVENTION

A developer of an animation video standardizes model input size to ensure hardware compatibility and advise zero padding to an input to support different input resolutions. Basically, the different input resolutions leads to high latency, more memory requirement and high power consumption. A strategy to support multiple input resolutions without padding using a single network is necessary. Further, different aspect ratio support is required for several AI solutions (in an example, camera application feature like portrait feature, video bokeh feature, scene optimizer feature, video zooming feature, or the like).

Further, a video inference typically involves redundant computations since consecutive frames contain same information for the most parts. Opportunity to reduce computations if the inference is optimized. A general processing unit (GPU) incompatibility with dynamic reshaping of input poses challenges in handling varying input sizes.

OBJECT OF INVENTION

Aspects of the disclosure are to address at least the above-mentioned problems and/or disadvantages and to provide at least the advantages described below. Accordingly, an aspect of the disclosure is to provide a method and an electronic device for in-place transformation of an input image for an on-device AI model by an electronic device.

Another aspect of the disclosure is to efficient compute of varied region of interest input dimensions of the input image.

Another aspect of the disclosure is to provide a model input size invariant or selectively process certain regions in an image and provide supporting compute unit (e.g., CPU/GPU/neural processing unit (NPU)) kernels to handle dynamic changes in layer input(s) and output(s).

Another aspect of the disclosure is to detect a change in the scale of the input frame from a first scale to a second scale in a preview mode, so as to operate on an image or a video frame only on selective areas to benefit in terms of latency and power savings.

Another aspect of the disclosure is to provide a transformed input frame to the on-device AI model for image processing without reinitializing the AI model.

Additional aspects will be set forth in part in the description which follows and, in part, will be apparent from the description, or may be learned by practice of the presented embodiments.

SUMMARY OF INVENTION

In an embodiment, a method for processing an input frame for an on-device AI model is provided. The method may include obtaining an input frame. The method may include building at least one kernel independent of the scale of the input frame by passing input variables to the at least one kernel using preprocessor directives independent of the scale of the input frame. The method may include inputting the input frame to the on-device AI model including the at least one kernel independent of the scale of the input frame. The method may include processing the input frame in the on-device AI model.

In an embodiment, an electronic device for processing an input frame for an on-device AI model is provided. The electronic device may include a memory and at least one processor. The at least one processor may be configure to obtain an input frame. The at least one processor may be configure to build at least one kernel independent of the scale of the input frame by passing input variables to the at least one kernel using preprocessor directives independent of the scale of the input frame. The at least one processor may be configure to input the input frame to the AI model including the at least one kernel independent of the scale of the input frame. The at least one processor may be configure to process the input frame in the AI model.

In an embodiment, a machine-readable medium containing instruction that when executed cause at least one processor of an electronic device to obtain an input frame. The at least one processor may be configure to build at least one kernel independent of the scale of the input frame by passing input variables to the at least one kernel using preprocessor directives independent of the scale of the input frame. The at least one processor may be configure to input the input frame to the AI model including the at least one kernel independent of the scale of the input frame. The at least one processor may be configure to process the input frame in the AI model.

Other aspects, advantages, and salient features of the disclosure will become apparent to those skilled in the art from the following detailed descriptions, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which:

FIGS. 3A and 3B are flowcharts illustrating a method for in-place transformation of an input image for an on-device AI model by an electronic device, according to various embodiments of the disclosure;

Throughout the drawings, it should be noted that like reference numbers are used to depict the same or similar elements, features, and structures.

DETAILED DESCRIPTION OF INVENTION

Figure 1:
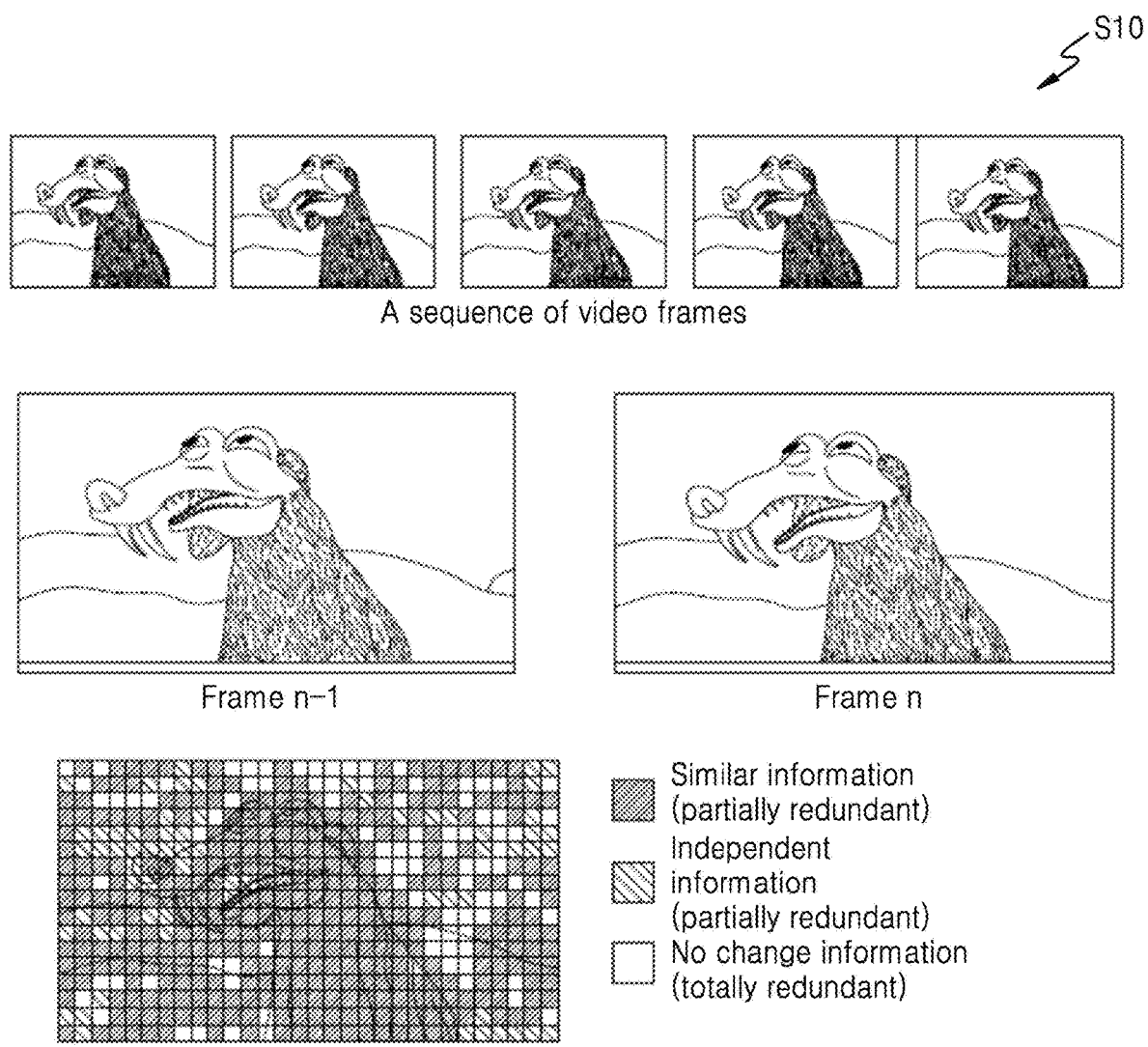
FIG. 1 is an illustration in which processing of a video is explained according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The term and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Accordingly, embodiments herein achieve a method for in-place transformation of an input image for an on-device AI model by an electronic device. The method includes receiving, by the electronic device, the input image. Further, the method includes detecting, by the electronic device, at least one RoI in the input image, wherein the at least one RoI is in a first scale. Further, the method includes initiating, by the electronic device, the on-device AI model to process the input image. Further, the method includes detecting, by the electronic device, a change in the first scale of the at least one RoI to a second scale. Further, the method includes detecting, by the electronic device, a size of the at least one ROI. Further, the method includes transforming, by the electronic device, the at least one RoI from the first scale to the second scale by reducing the size of the at least one RoI. Further, the method includes inputting, by the electronic device, the at least one transformed RoI to the on-device AI model for image processing. The at least one transformed RoI is inputted to the on-device AI model without reinitializing and re-caching the on-device AI model.

Unlike conventional methods and systems, the proposed method can be used for efficient computing of images/video frames by i) removing any zero padding added to handle multiple aspect ratios using the on-device AI model ii) using smart compute unit kernels to eliminate the overhead due to re-initialization and re-caching of the on-device AI model when the resolution of the input changes iii) operating using smart ROI operators either differently or only on selective regions in the image.

The proposed method can be used to perform an in-place transformation layer along with novel GPU kernels allows using the on-device AI model to handle multiple resolution more efficiently. The smart ROI kernels will reduce the burden to process areas and avoid collateral computation loss. The on-device AI model does not require any additional training and works seamlessly with any computer architecture.

In the proposed method, the in-place transformation layer is added as a second input to the on-device AI model which would give the information on actual resolution size of the input at runtime. The in-place transformation layer performs In-place transformation of the input data into required new size. In the proposed method, maximum memory will be allocated to memory buffer for each layer at model initialization stage and this memory will be re-used for all different resolutions without the need for reconstructing the graph with new input and output dimensions.

The proposed method can be used for operating an image or a video frame only on selective areas to benefit in terms of latency and power savings. In the proposed method, modification of deep neural network (DNN) input and operators to support multiple different resolutions on non-CPU compute unit to achieve better optimization in the on-device AI model open time and inference time latency, runtime memory reduction, MACC reduction and up to 30 percent reduction in power.

The method can be used for designing the GPU OpenCL kernels which are independent of input sizes. The method can be used for designing smart kernels to perform operation based on local information.

The method can be implemented in camera application feature (e.g., portrait bokeh feature, video bokeh feature, scene optimizer feature, video zooming feature, or the like) where different input resolutions need to be handled. The method can be used to handle the efficient video processing in a portrait and landscape resolution.

In the proposed method, whenever there is an input resolution change, it is detected and the tensor handles are reinitialized. This takes a fraction of time. The global workgroup sizes of the constituent kernels are reconfigured to handle the new resolutions. This takes an insignificant amount of time. In the existing method, each time the resolution changes the kernel needs to be re-compiled and re-cached which adds to latency. With proposed method, the lower latency can be achieved.

The proposed method is used where a neural network dynamically accepts images of various resolutions in runtime and provides the desired output of the (classification/segmentation) model. In mobile applications this saves inference time particularly in portrait mode. For example, to facilitate processing multiple resolutions with the same model, images are generally padded with zeros to achieve a square size. Using the proposed disclosure, regions with zero pixels are ignored. Furthermore, since arrangement to not process the regions that do not contain information or include redundant information can be done, processing time, power can be saved, CPU utilization, or the like, can be saved.

FIG. 1 is an illustration in which processing of a video is explained according to the related art.

Referring to FIG. 1, it illustrates redundancy in information across frames n–1 of a sequence of frames S10 in a video. In the method and system of the related art, the region that can be processed cannot be dictated due to which the regions including the redundant information will also be processed resulting in more processing time, central processing unit (CPU) utilization, memory usage, power consumption of the device, or the like.

The above information is presented as background information only to assist with an understanding of the disclosure. No determination has been made, and no assertion is made, as to whether any of the above might be applicable as prior art with regard to the disclosure.

In an embodiment, a frame may include similar information, independent information, no change information. Similar information may be partially redundant. Independent information may be partially redundant. No change information may be totally redundant.

Referring now to the drawings, and more particularly to FIGS. 2, 3A, 3B, and 4 to 11, there are illustrated preferred embodiments.

Figure 2:
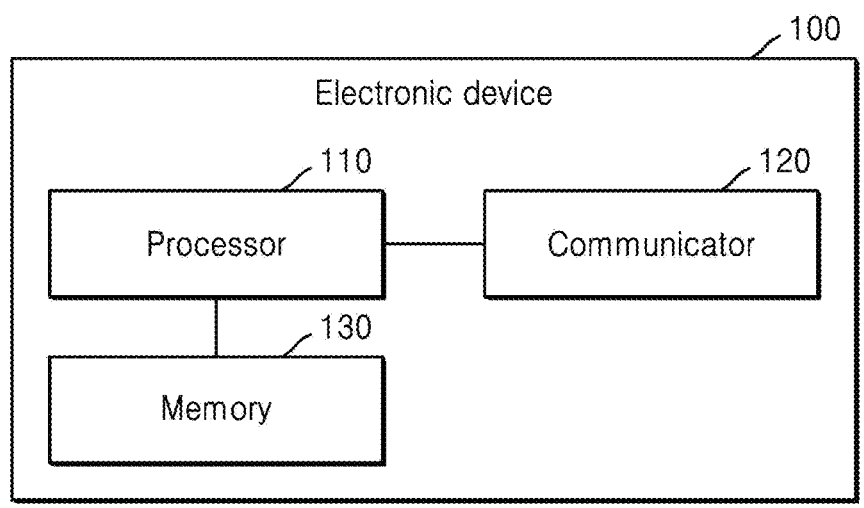
FIG. 2 illustrates various hardware components of an electronic device according to an embodiment of the disclosure.

FIG. 2 illustrates various hardware components of an electronic device according to an embodiment of the disclosure.

Referring to FIG. 2, the electronic device 100 can be, for example, but not limited to a foldable device, a cellular phone, a smart phone, a personal digital assistant (PDA), a tablet computer, a laptop computer, an immersive device, a virtual reality device, a videography system, a camera, an Internet of things (IoT), a drone, an IOT sensor, or the like. The electronic device 100 includes at least one processor 110, a communicator 120, a memory 130. The processor 110 is provided with the communicator 120, the memory 130.

The at least one processor at least one processor110 is configured to receive the image and detect a RoI in the input image. The RoI is in a first scale. Further, the at least one processor 110 is configured to initiate the on-device AI model configured to process the input image and detect a change in the first scale of the RoI to a second scale. In an embodiment of the disclosure, the at least one processor 110 is configured to determine a zoom event, a change in aspect ratio of the RoI of the image, a change in orientation of the RoI of the image, a change in resolution of the RoI of the image, and a change in the RoI of the image. The at least one processor 110 is configured to detect the change in the first scale of the RoI to the second scale in response to detecting the zoom event, the change in aspect ratio of the RoI of the image, the change in orientation of the RoI of the image, the change in resolution of the RoI of the image, and the change in the ROI in the RoI of the image.

Further, the at least one processor 110 is configured to detect a size of the ROI and transform the RoI from the first scale to the second scale by reducing the size of the RoI. In an embodiment of the disclosure, the at least one processor 110 is configured to detect a zero padded area and an area without pixels in the RoI of the first area. Further, the at least one processor 110 is configured to transform the RoI from the first scale to the second scale by removing the zero padded area and the area without pixels in the RoI.

Further, the at least one processor 110 is configured to input the transformed RoI to the on-device AI model for image processing. The transformed RoI is inputted to the on-device AI model without reinitializing and re-caching the on-device AI model. The AI model may be an on-device AI model.

Further, the at least one processor 110 is configured to activate a kernel of the on-device AI model on the transformed RoI of the image for image processing. In an embodiment of the disclosure, the at least one processor 110 is configured to determine area corresponding to the ROI in the transformed RoI of the image and activate the kernel of the on-device AI model on the area corresponding to the ROI in the transformed RoI of the image.

Further, the at least one processor 110 is configured to generate an output image with processed regions of the transformed RoI of the image. In an embodiment of the disclosure, the at least one processor 110 is configured to determine whether a pixel is a part of the ROI. In response to determining that the pixel is part of the ROI, the at least one processor 110 is configured to perform regular convolution operation or pool operations. In response to determining that the pixel is not part of the ROI, the at least one processor 110 is configured to copy the pixel. In an example, at each pixel, the at least one processor 110 checks the neighborhood for information. If no or less information is available, the at least one processor 110 chooses inexpensive operation instead of operations like convolution. Further, the at least one processor 110 is configured to generate the output image. The output image includes the processed regions returned to locations of the ROI based on spatial changes.

The at least one processor 110 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor 110 is configured to execute instructions stored in the memory 130 and to perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in random access memory (RAM) or cache). The memory may include the AI model for processing input frame.

Further, at least one of the plurality of modules/controller may be implemented through the AI model using the at least one processor 110. A function associated with the AI model may be performed through the non-volatile memory, the volatile memory, and the processor 110. The processor 110 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/or may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 2 illustrates various hardware components of the electronic device 100 but it is to be understood that other embodiments are not limited thereon. In other embodiments of the disclosure, the electronic device 100 may include less or more number of components. Further, the labels or names of the components are used only for illustrative purpose and does not limit the scope of the disclosure. One or more components can be combined together to perform same or substantially similar function in the electronic device 100.

Figure 3A:
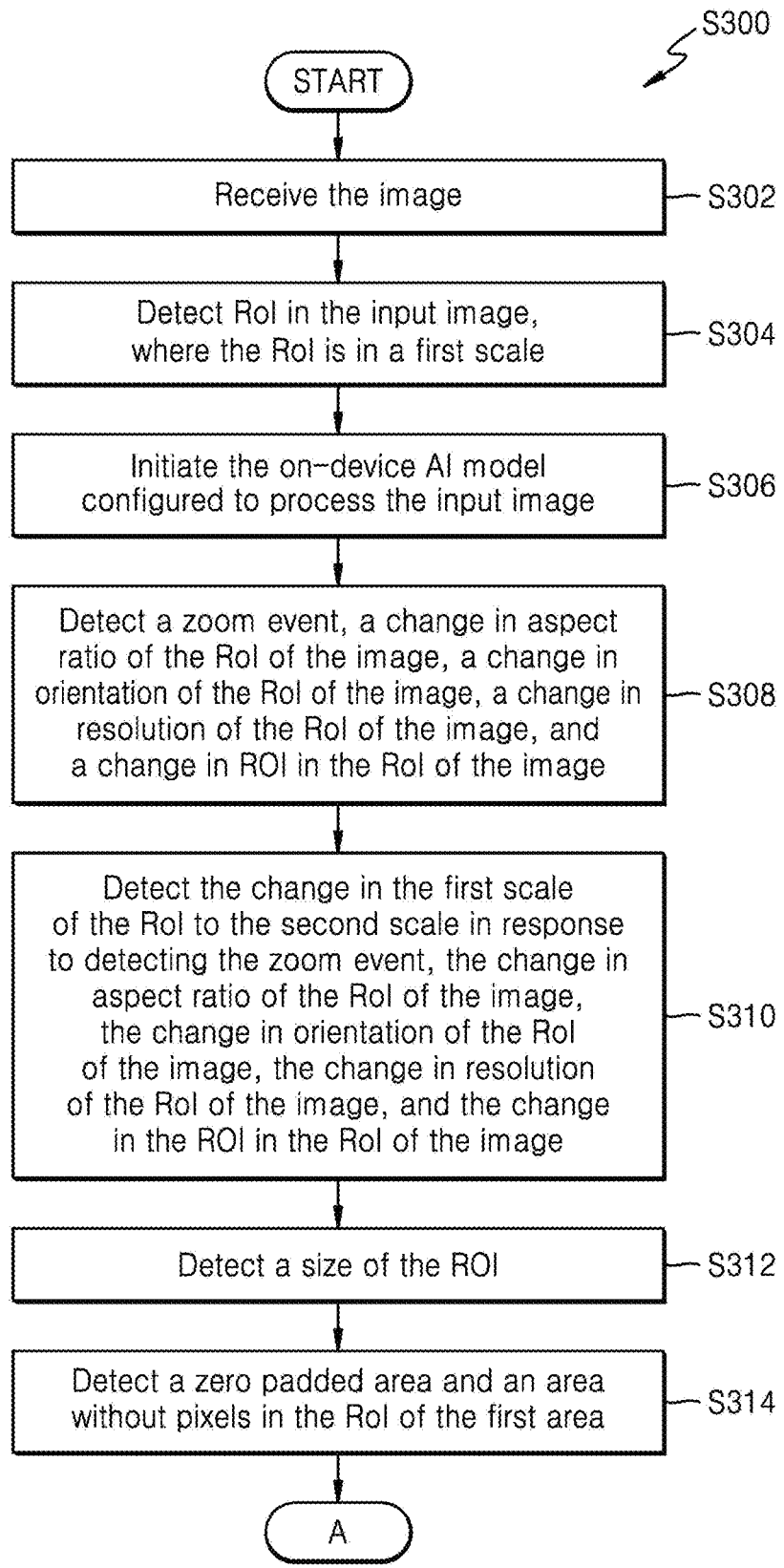

FIGS. 3A and 3B are flowcharts S300 illustrating a method for in-place transformation of an input image for an on-device AI model by an electronic device according to various embodiments of the disclosure.

Referring to FIGS. 3A and 3B, operations S302-S330 are performed by the at least one processor 110.

At operation S302, the method includes receiving the image. At operation S304, the method includes detecting the RoI in the input image. The RoI is in the first scale. At operation S306, the method includes initiating the on-device AI model configured to process the input image. At operation S308, the method includes detecting at least one of the zoom event, the change in aspect ratio of the RoI of the image, the change in orientation of the RoI of the image, the change in resolution of the RoI of the image, and the change in ROI in the RoI of the image. At operation S310, the method includes detecting the change in the first scale of the RoI to the second scale in response to detecting at least one of the zoom event, the change in aspect ratio of the RoI of the image, the change in orientation of the RoI of the image, the change in resolution of the RoI of the image, and the change in the ROI in the RoI of the image.

At operation S312, the method includes detecting the size of the ROI. At operation S314, the method includes detecting the zero padded area and the area without pixels in the RoI of the first area. At operation S316, the method includes transforming the RoI from the first scale to the second scale by removing the zero padded area and the area without pixels in the RoI. At operation S318, the method includes inputting the transformed RoI to the on-device AI model for image processing. The transformed RoI is inputted to the on-device AI model without reinitializing and re-caching the on-device AI model.

At operation S320, the method includes determining the area corresponding to the ROI in the transformed RoI of the image. At operation S322, the method includes activating the kernel of the on-device AI model on the area corresponding to the ROI in the transformed RoI of the image. At operation S324, the method includes determining whether the pixel is part of the ROI.

In response to the pixel is not part of the ROI, at operation S326, the method includes copying the pixel. In response to the pixel is part of the ROI, at operation S328, the method includes performing the regular convolution operation or pool operations. At operation S330, the method includes generating the output image, wherein the output image includes the processed regions returned to locations of the ROI based on spatial changes.

Figure 4:
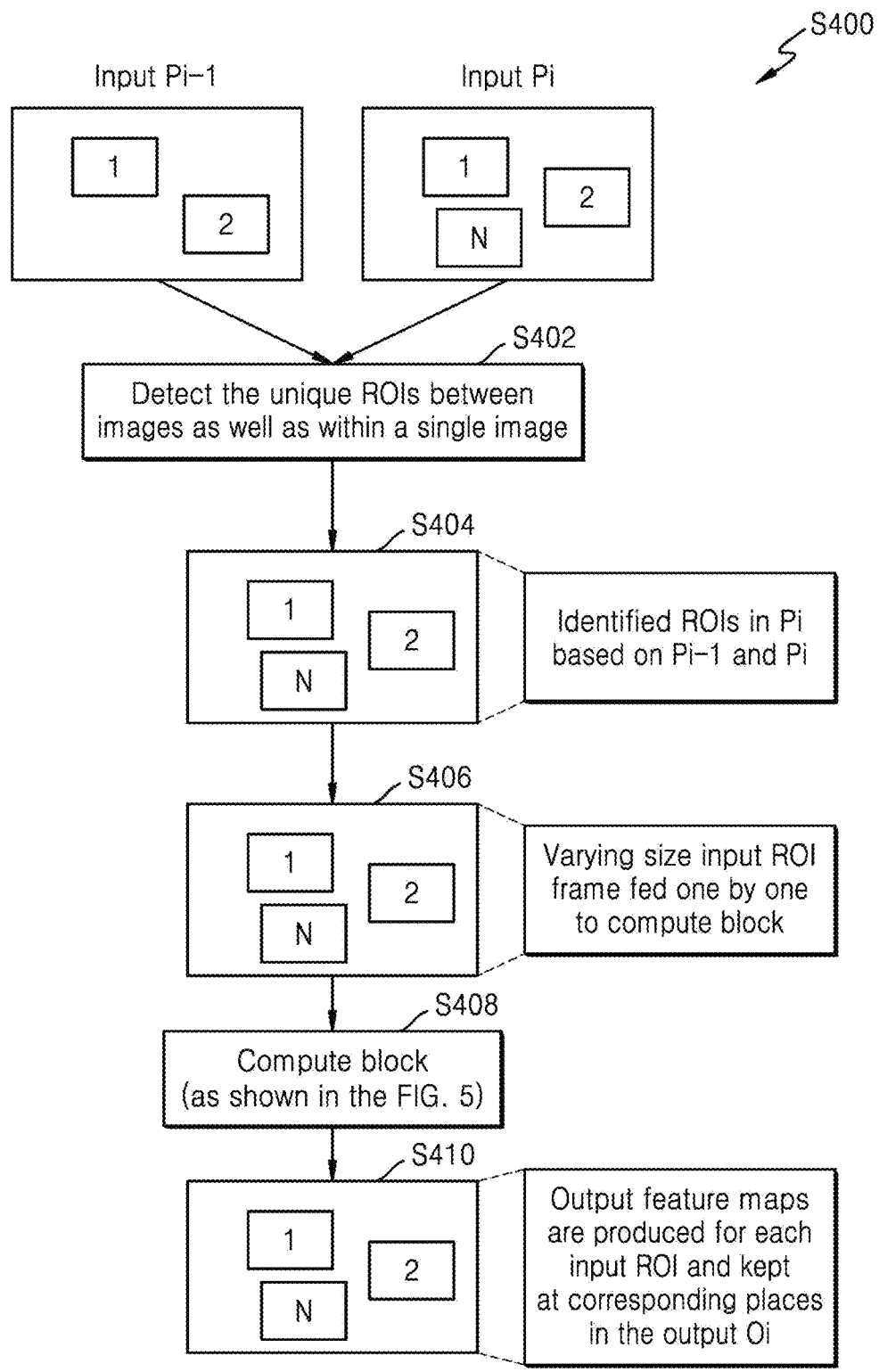
FIG. 4 is a flowchart illustrating a method for in-place transformation of an input image for an on-device AI model according to an embodiment of the disclosure.

FIG. 4 is a flowchart S400 illustrating a method for in-place transformation of an input image for an on-device AI model according to an embodiment of the disclosure.

Referring to FIG. 4, operations S402-S410 are performed by the at least one processor 110.

At operation S402, the method includes detecting the unique ROIs between images as well as within the single image. At operation S404, the method includes identifying the ROIs in Pi based on Pi−1 and Pi. At operation S406, the method includes varying size input ROI frame fed one by one to compute block (e.g., on-device AI model). At operation S408, the method includes operating the compute block (detailed operations explained in FIG. 5). At operation S410, the method includes producing the output feature maps for each input ROI and kept at corresponding places in the output Oi.

Figure 5:
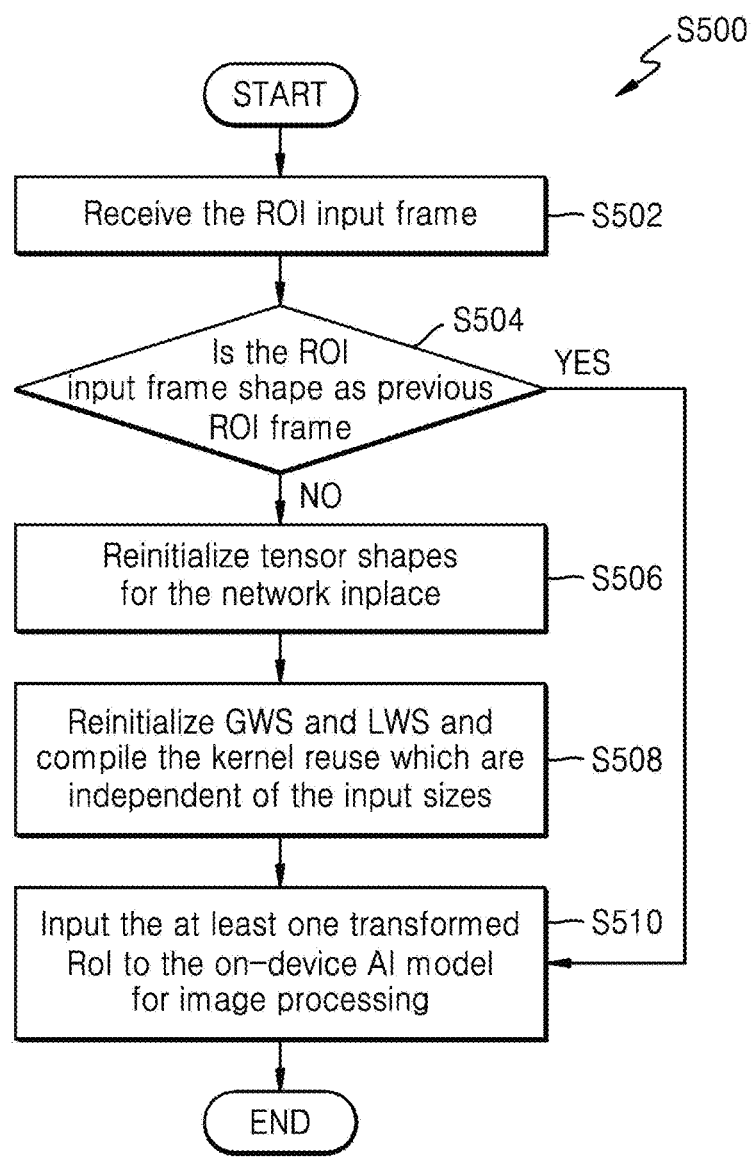
FIG. 5 is a flowchart illustrating operation of a compute block according to an embodiment of the disclosure.

FIG. 5 is a flowchart S500 illustrating operation of a compute block according to an embodiment of the disclosure.

Referring to FIG. 5, operations S502-S510 are performed by the at least one processor 110.

At operation S502, the method includes receiving the ROI input frame. At operation S504, the method includes determining whether the ROI input frame shape is same as previous ROI frame. In response to determining that the ROI input frame shape is not same as previous ROI frame, at operation S506, the method includes reinitializing tensor shapes for the network in-place. At operation S508, the method includes reinitializing global workgroup size (GWS) and local window strategies (LWS) and compiling kernel reuse which are independent of the input sizes. In response to determining that the ROI input frame shape is same as previous ROI frame, at operation S510, the method includes inputting the transformed RoI to the on-device AI model for image processing.

Figure 6:
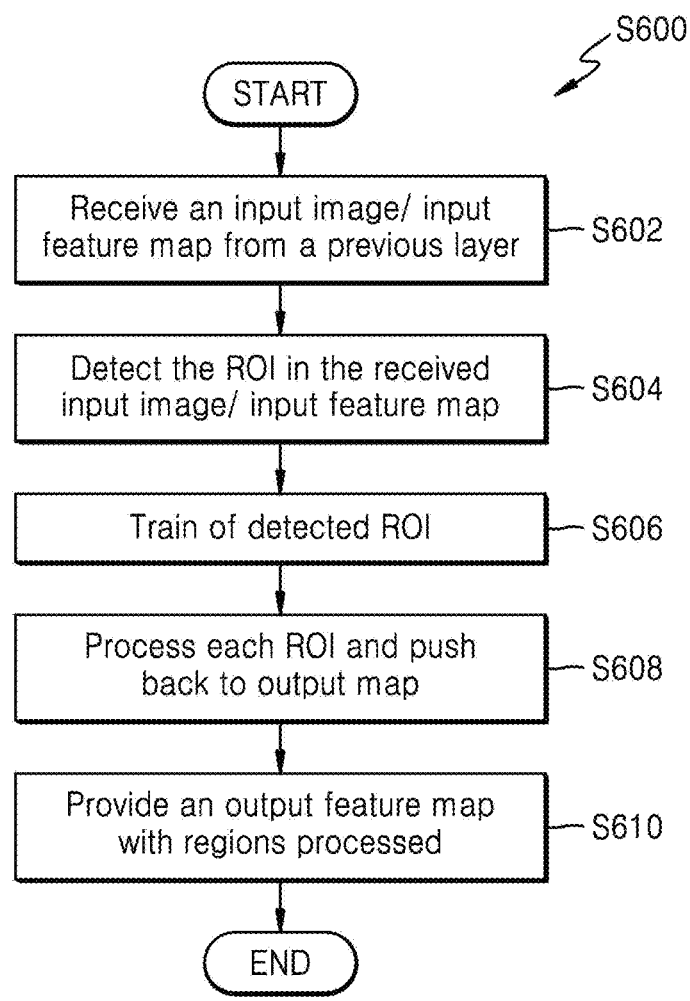
FIG. 6 is a flowchart illustrating operation of an in-place transformation layer in an on-device AI model according to an embodiment of the disclosure.

FIG. 6 is a flowchart S600 illustrating operation of an in-place transformation layer according to an embodiment of the disclosure.

Referring to FIG. 6, operations S602-S610 are performed by the at least one processor 110.

At operation S602, the method includes receiving the input image/input feature map from a previous layer of the on-device AI model. At operation S604, the method includes detecting the ROI in the received input image/input feature map. At operation S606, the method includes training the detected ROI. At operation S608, the method includes processing each ROI and push back to an output map. At operation S610, the method includes providing the output feature map with regions processed.

Figure 7:
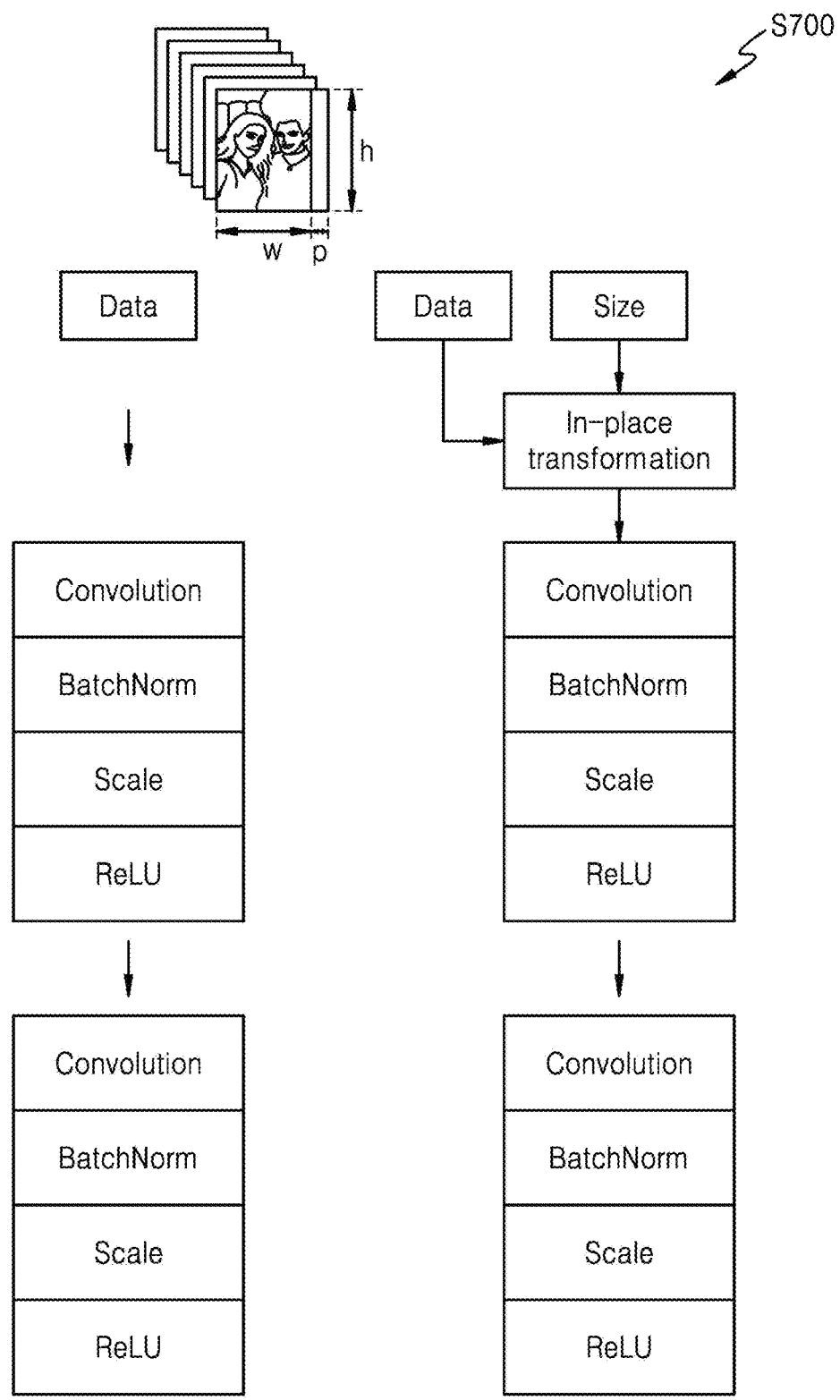
FIG. 7 is an illustration in which an in-place transformation layer operation is depicted according to an embodiment of the disclosure.

FIG. 7 is an illustration S700 in which an in-place transformation layer operation is depicted according to an embodiment of the disclosure.

Referring to FIG. 7, an in-place transformation layer uses the zero padding size information and carefully resizes it to real image size. The in-place transformation layer identifies the padded area and uses this information to remove padded area and identify input output sizes for subsequent layers. Further, the in-place transformation layer is placed immediately after the input layer. The zero padding size information is input to the on-device AI model or identified in automated way by traversing the image row-wise or column-wise. The in-place transformation layer trains the ROIs which are identified by manual input or in an automated way and these can be processed instead of the entire image. The rest of the image will follow inexpensive operation suited to the target application. Once the identified ROI is processed, the ROIs are returned to expected location in the frame taking into account the spatial changes due to the processing.

In an embodiment of the disclosure, the in-place transformation layer removes the pixels that are outside the original image dimensions to feed the next layer in the on-device AI model. The in-place transformation layer is compatible with on device GPU. The kernels are designed to be independent of the input dimensions and changes due to the in-place transformation layer are handled in the backend. This helps in avoiding re-compiling and re-caching of kernels and removes the overhead caused by reinitialization of the neural network. The global and local workgroup sizes are reinitialized with helper functions, which have a negligible impact during resolution change. This novel method can also be extended to other high performance compute units like digital signal processor (DSP) or NPU.

Figure 8:
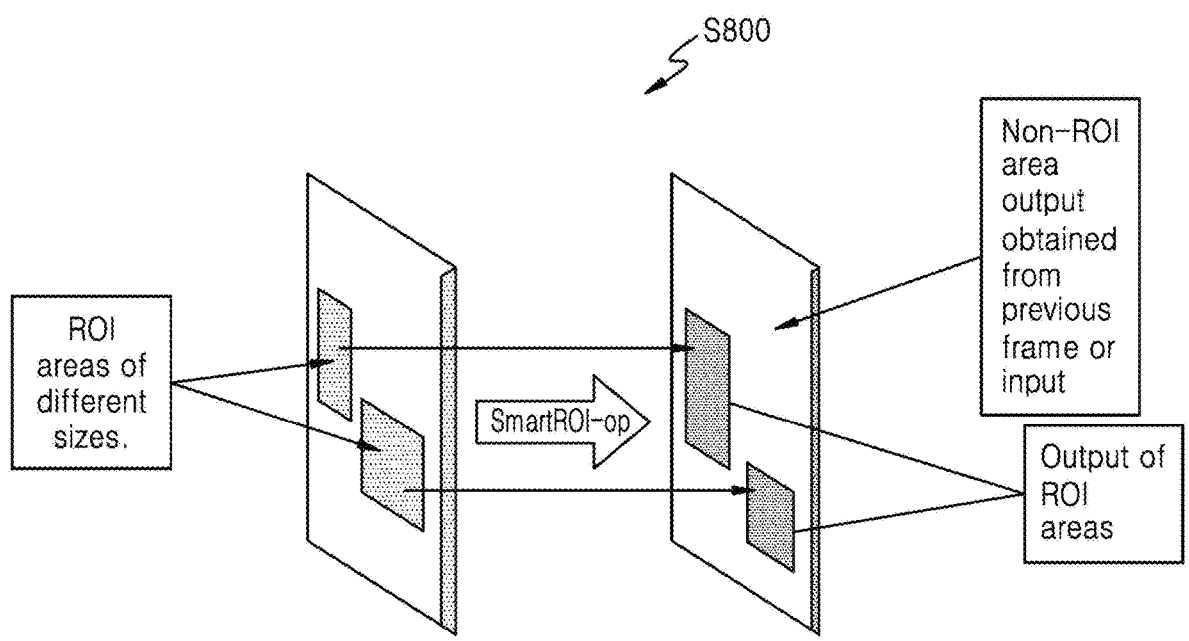
FIGS. 8 and 9 are illustrations in which an on-device AI model operation is depicted, according to various embodiments of the disclosure.
Figure 9:
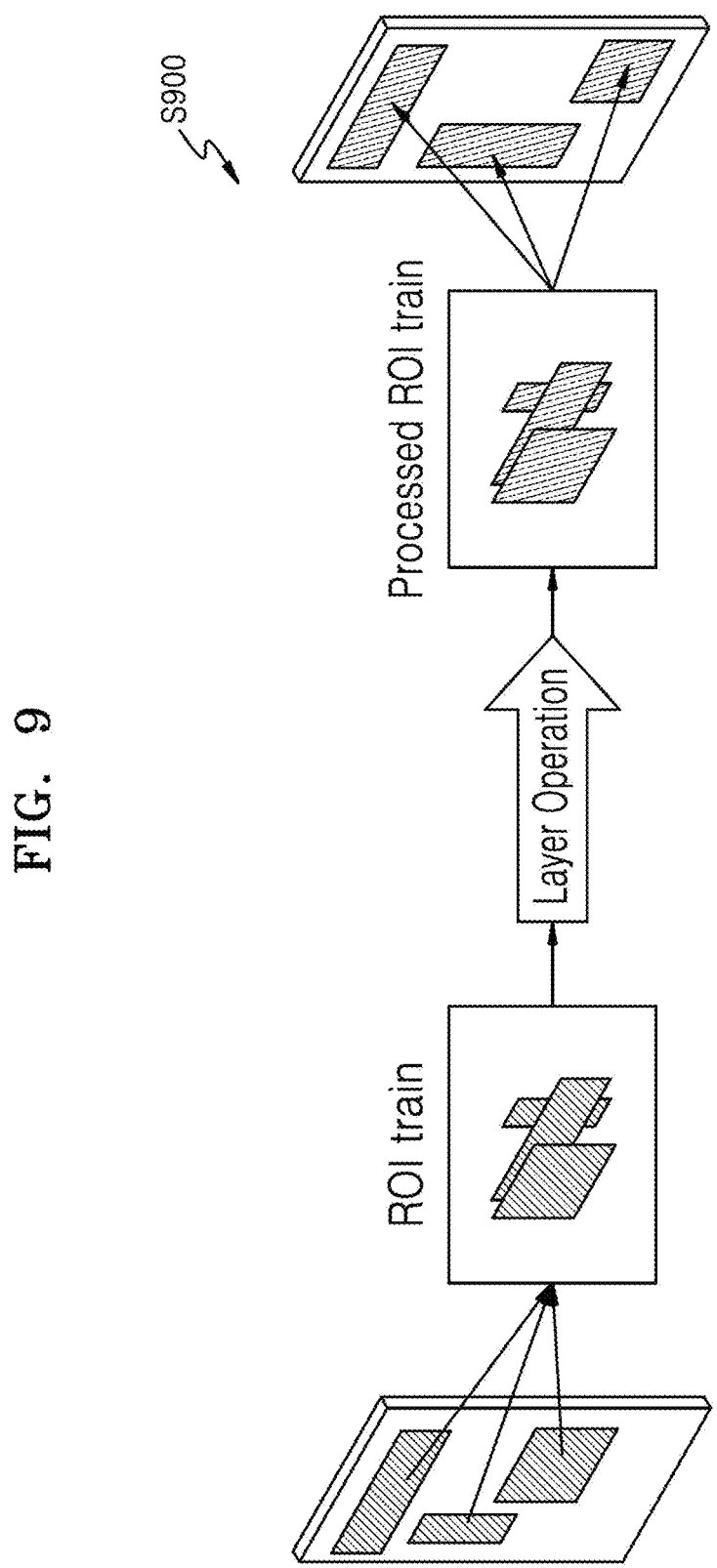

FIGS. 8 and 9 are illustrations S800 and S900 in which an on-device AI model operation is depicted according to various embodiments of the disclosure.

Referring to FIG. 8, the on-device AI model receives the ROI areas of different sizes. Based on the proposed method, the on-device AI model provides output of ROI areas only new information. The non-ROI area output is obtained from the previous frame or the input frame. In an example, for the video, successive frames will contain redundant information and operating on every frame leads to unnecessary computations. Based on the proposed method, the on-device AI model handles/operates the frames including the new information.

Referring to FIG. 9, for the on-device AI model, the ROIs are identified in the image/frame. The train of the ROIs can be identified by manual input or in the automated way and these can be processed instead of the entire image. The rest of the image will follow inexpensive operation suited to the target application. Once the ROIs are processed, the ROIs are returned to expected location in the frame taking into account the spatial changes due to the processing.

Figure 10:
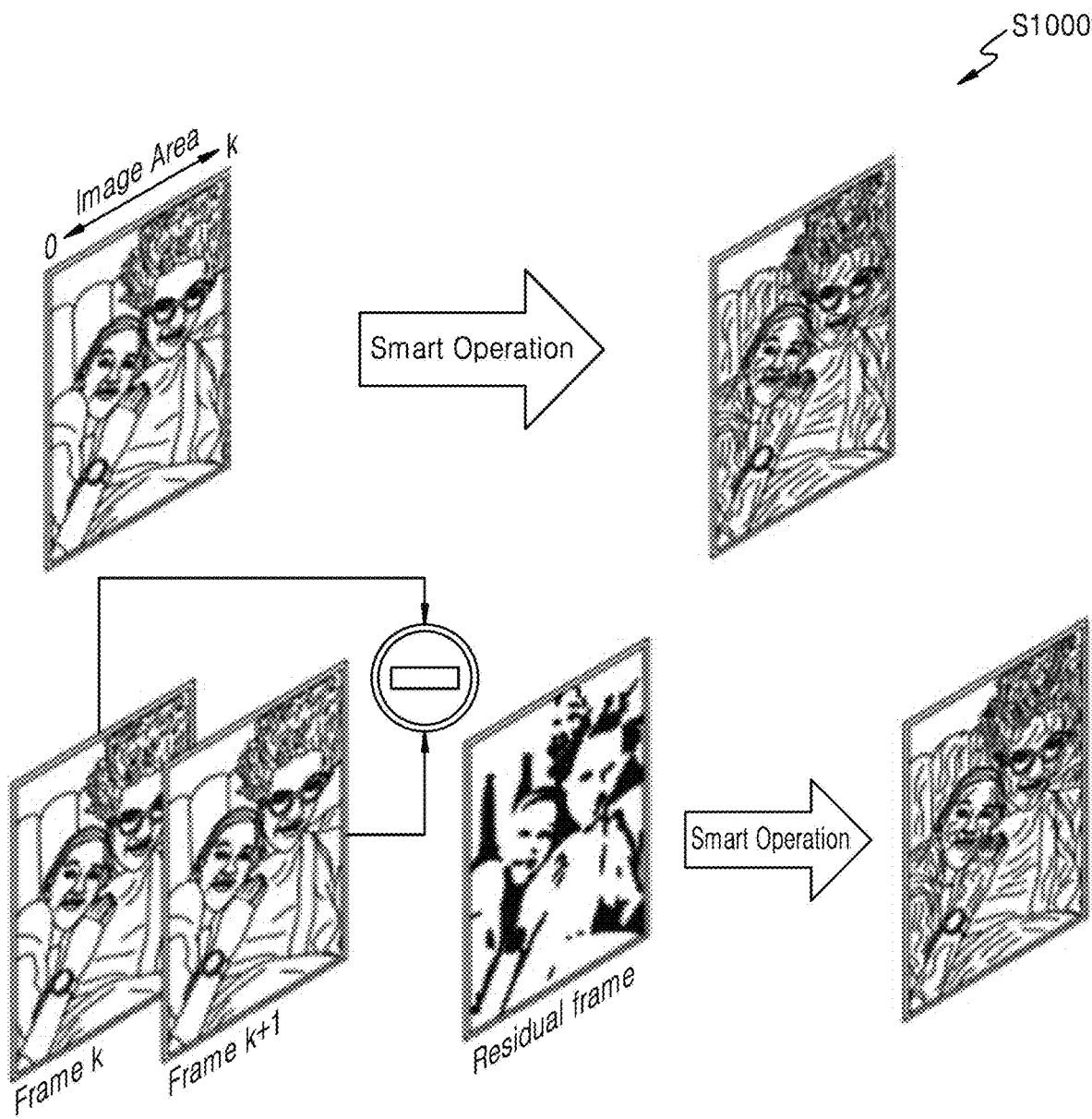
FIG. 10 is an illustration in which a smart ROI operation is explained, according to an embodiment of the disclosure.

FIG. 10 is an illustration S1000 in which a Smart ROI operation is explained according to an embodiment of the disclosure.

Referring to FIG. 10, based on the proposed method, the electronic device 100 receives the input images including the different resolutions. The electronic device 100 provides the output of ROI areas by using only new information. The non-ROI area output is obtained from the previous frame or the input frame. This reduces the unnecessary computation.

In an embodiment, frame k and frame k+1 may be contained successively in the successive frames. The successive frames may be included in a sequence of video frames. The background is static in most of the case and there is only a small movement of the subjects in the successive frames. If the background in frame k is already processed, processing the background in frame k+1 is redundant. The difference in pixels between frame k and frame k+1 in successive frames is called a residual frame.

In an embodiment, the input frame may be one of successive frames. For example, the input frame may be frame k+1. In this case, the residual frame of the frame k and frame k+1 may be ROI. And, the remaining part of frame k+1 may be non-ROI. Incidentally, the remaining part of frame k+1 is corresponding region of frame k as well. Because ROI of frame k+1 is obtained as the difference in pixels between frame k and frame k+1.

In an embodiment, electronic device may process the residual frame by performing neural network operation (e.g., convolution, pooling). The electronic device may copy the remaining part of the residual frame. The output frame may be the sum of the processed residual frame and the copied the remaining part, or may be similar thereto.

Figure 11:
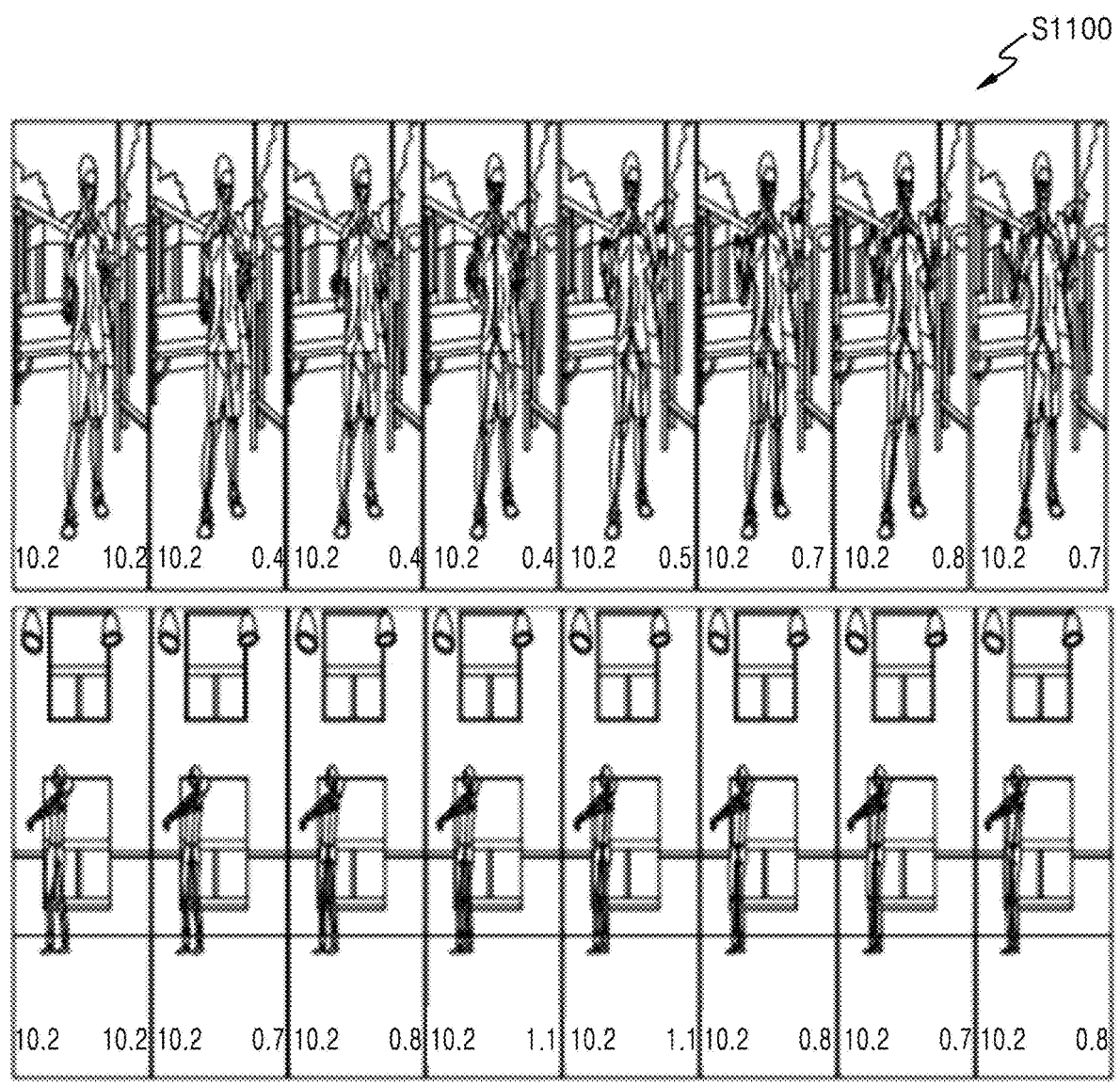
FIG. 11 is an illustration in which an efficient video processing is explained, according to an embodiment of the disclosure.

FIG. 11 is an illustration (S1100) in which an efficient video processing is explained according to an embodiment of the disclosure.

Referring to FIG. 11, selectively operating on ROI in residual frame using a skip gate to reduce latency. Time in light grey indicate time taken to process in traditional methods. Time in block indicates optimized processing time obtained by selectively operating on ROIs.

Figure 12:
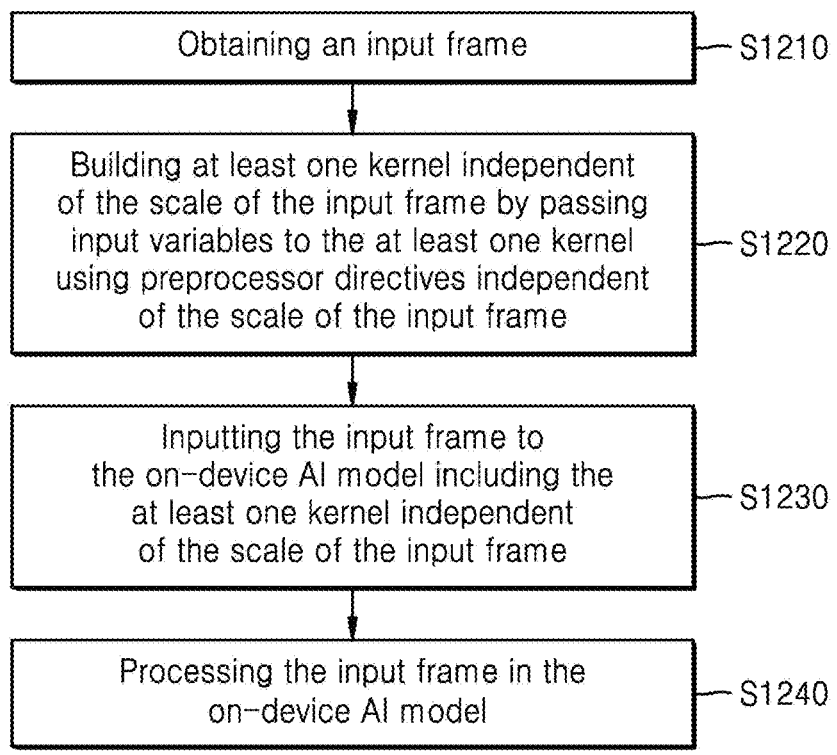
FIG. 12 is a flowchart illustrating a method for processing an input frame for an on-device AI model.

FIG. 12 is a flowchart illustrating a method for processing an input frame for an on-device AI model.

In operation S1210, the electronic device 100 may obtain an input frame. For example, the electronic device 100 may obtain the input frame from another electronic device such as a server, etc. The electronic device may obtain the input frame from successive frames, such as a video.

In operation S1220, the electronic device 100 may build at least one kernel independent of the scale of the input frame by passing input variables to the at least one kernel using preprocessor directives independent of the scale of the input frame.

For example, the at least one kernels may be GPU (e.g. OpenCL) kernels. In OpenCL kernel designing, a kernel is a function that executes in parallel in multiple compute cores. There are two ways in which input variables (e.g. padding values, rounding mode, etc.) can be passed to OpenCL kernels. The first way is via arguments to the kernel functions. And, the second way is via preprocessor directives (e.g. macros) during building of the kernel program. Preprocessor directives are typically used to make source programs easy to change and compile in different execution environment. The preprocessor directives in the source file tell the preprocessor to take specific actions. The preprocessor directives are invoked by the compiler to process some programs before compilation.

It's a common practice in OpenCL programming to pass as many the input variables as possible to the kernel via preprocessor directives as possible. Whatever the input variables are passed via preprocessor directives are used in building the kernel program. So, if there are any preprocessor directives that are dependent on input scale, the electronic device 100 cannot reuse the already built kernel programs. So, the electronic device 100 may build the OpenCL kernels in such a way that all the input variables which are dependent on the input scale are passed as arguments to the kernel function. Due to this approach, input variables by preprocessor will not change when input scale changes, so there will not to be a need for building the kernel program again.

When a neural network is loaded into the memory for execution, the representation of the network in memory is complete for all the layers (e.g. convolution, activation, etc.), their inputs and outputs (e.g. how one layer's outputs are connected to following layer's input slots). Pointers to memory containing input and output tensors are called tensor handles. In the prior art, the electronic device 100 had to rebuild the kernels with a changed scale. So, the electronic device 100 had to erase all of data associated with the build kernels and redo memory allocation.

But now, the electronic device 100 may use at least one kernel independent of the scale of the input frame by passing variable to the at least one kernel using preprocessor directives independent of the scale of the input frame. In other words, the electronic device 100 can use the built-in at least one kernel. The electronic device 100 may use the same network representation simply by reconstructing the tensor handles and allocating the corresponding memory. It means the electronic device 100 may reconstruct tensor handles in-place from the same network representation. It also changes the global workgroup size (GWS) according to the changes of the scale of the input frame in the same network representation. The electronic device 100 may not generate the entire plan and rebuild the kernels, there is a significant saving in loading the network into memory.

The GWS is a parameter that depends on the kernel's output. There is an OpenCL API to set the GWS of OpenCL kernel. The electronic device 100 may use the OpenCL API to reconfigure the GWS for kernels on the network based on the kernel's output scale when there is a scale change. So, when the output scale of the kernel goes up (e.g. which usually happens when the input scale goes up), the GWS goes up. And, the output scale of the kernel goes down, the GWS goes down.

In operation S1230, the electronic device 100 may input the input frame to the on-device AI model including the at least one kernel independent of the scale of the input frame.

In operator S1240, the electronic device 100 may process the input frame using the on-device AI model including the at least one kernel independent of the scale of the input frame. In an embodiment, the on-device AI model may include an in-place transformation layer. The in-place transformation layer may be placed after an input layer in the on-device AI model for processing image. In the in-place transformation layer, the electronic device may identify a region including at least one pixel included in the input frame as a RoI. The electronic device may identify at least one RoI in input frame. The electronic device may identify the padding area and the image area by traversing the input frame in on-device AI model. Therefore, the electronic device can identify the scale of the image area.

In an embodiment, the in-place transform layer may receive information associated with the scale of the image area, the scale of the input frame, the scale of the padding area and the input frame. The electronic device may remove the padding area. In the in-place transform layer, the electronic device may remove the padding area if the input frame includes the padding area. And, the electronic device may identify the remaining region after the padding area is removed as the RoI.

In an embodiment, the electronic device may obtain at least one region designated by a user as the at least one RoI based on a user input including information on the region designated by the user.

In an embodiment the electronic device may obtain a residual frame representing a difference between the input frame included in successive frames and the previous frame of the input frame as the at least one RoI.

In an embodiment the electronic device may perform neural network operation including convolution operation or pooling operation, for the region identified as the at least one RoI within the input frame. In an embodiment, the electronic device may copy the region identified as the non-RoI representing the remaining region of the RoI within the input frame. In an embodiment, the electronic device may generate an output image based on the performing of the neural network operation for the region identified as the at least one RoI and the copying of the region identified as the non-RoI.

In an embodiment the electronic device may obtain the processed at least one RoI by performing the neural network operation for the region identified as the at least one RoI within the input frame. The electronic device may return the processed at least one RoI to expected location in the output frame taking into account the spatial changes. For example, given, the scale of the input frame and the output frame, the at least one processed RoI can be returned to its expected location within the output frame. In addition, when the residual frame is obtained as the RoI, the output frame may be generated by performing an element-by-element addition operation on the pixel at a corresponding location in each frame, considering the scale of the input frame and the scale of the output frame.

Figure 13:
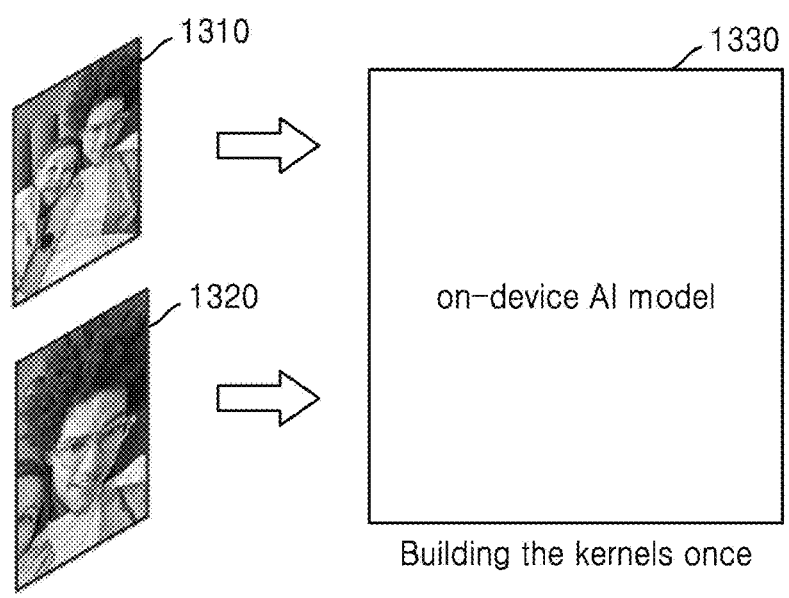
FIG. 13 is an example illustration for processing an input frame for an on-device AI model.

FIG. 13 is an example illustration for processing an input frame for an on-device AI model.

In an embodiment, the input frame may be a first frame (1310) or a second frame (1320). Also, the scale of the first frame (1310) and the second frame (1320) may be different. In an embodiment, the on-device AI model (1330) may process the first frame (1310). In an embodiment, the on-device AI model (1330) may receive the first frame (1310), be invoked, and process the first frame (1310). According to method of FIG. 12, the second frame (1320) can be processed using the existing kernels without rebuilding the kernels. The on-device AI model (1330) can process frames of various scales using an existing kernels. Accordingly, the execution time of the on-device AI model (1330) can be reduced as the time required to build the kernels is reduced compared to when the kernel is rebuild based on the scale of the existing input frame.

In an embodiment, a method for processing an input frame for an on-device AI model is provided. The method may include obtaining an input frame. The method may include building at least one kernel independent of the scale of the input frame by passing input variables to the at least one kernel using preprocessor directives independent of the scale of the input frame. The method may include inputting the input frame to the on-device AI model including the at least one kernel independent of the scale of the input frame. The method may include processing the input frame in the on-device AI model.

In an embodiment, the method may include identifying at least one Region of Interest (RoI) including at least one pixel included in the input frame.

In an embodiment, the method may include obtaining a remaining region after removing the padding area in the input frame as RoI. The method may include obtaining at least one region designated by a user as the at least one RoI based on a user input including information on the region designated by the user.

In an embodiment, the method may include obtaining a residual frame representing a difference between the input frame included in successive frames and the previous frame of the input frame as the at least one RoI.

In an embodiment, the method may include performing neural network operation, including convolution operation or pooling operation, for the region identified as the at least one RoI within the input frame. The method may include copying the region identified as the non-RoI representing the remaining region of the at least one RoI within the input frame. The method may include generating an output image based on the performing of the neural network operation for the region identified as the at least one RoI and the copying of the region identified as the non-RoI.

In an embodiment, the method may include obtaining the processed at least one RoI by performing the neural network operation for the region identified as the at least one RoI within the input frame. The method may include returning the processed at least one RoI to expected location in the output frame taking into account the spatial changes.

In an embodiment, the method may include identifying the padding area within the input frame by traversing the input frame in a row-wise and column-wise. The method may include obtaining information associated with the scale of the image area, the scale of the input frame, the scale of the padding area and the input frame. The method may include removing the padding area within the input frame based on the information.

In an embodiment, a method for processing an input frame for an on-device AI model is provided. The method may include obtaining an input frame. The method may include building at least one kernel independent of the scale of the input frame by passing input variables to the at least one kernel using preprocessor directives independent of the scale of the input frame. The method may include inputting the input frame to the on-device AI model including the at least one kernel independent of the scale of the input frame. The method may include processing the input frame in the on-device AI model.

In an embodiment, an electronic device for processing an input frame for an on-device AI model is provided. The electronic device may include a memory and at least one processor. The at least one processor may be configure to obtain an input frame. The at least one processor may be configure to build at least one kernel independent of the scale of the input frame by passing input variables to the at least one kernel using preprocessor directives independent of the scale of the input frame. The at least one processor may be configure to input the input frame to the AI model including the at least one kernel independent of the scale of the input frame. The at least one processor may be configure to process the input frame in the AI model.

In an embodiment, the at least one processor may be configure to identify at least one Region of Interest (RoI) including at least one pixel included in the input frame.

In an embodiment, the at least one processor may be configure to obtain a remaining region after removing the padding area in the input frame as RoI. Or, the at least one processor may be configure to obtain at least one region designated by a user as the at least one RoI based on a user input including information on the region designated by the user.

In an embodiment, the at least one processor may be configure to obtain a residual frame representing a difference between the input frame included in successive frames and the previous frame of the input frame as the at least one RoI.

In an embodiment, the at least one processor may be configure to perform neural network operation, including convolution operation or pooling operation, for the region identified as the at least one RoI within the input frame. The at least one processor may be configure to copy the region identified as the non-RoI representing the remaining region of the at least one RoI within the input frame. The at least one processor may be configure to generate an output image based on the performing of the neural network operation for the region identified as the at least one RoI and the copying of the region identified as the non-RoI.

In an embodiment, the at least one processor may be configure to obtain the processed at least one RoI by performing the neural network operation for the region identified as the at least one RoI within the input frame. The at least one processor may be configure to return the processed at least one RoI to expected location in the output frame taking into account the spatial changes.

In an embodiment, the at least one processor may be configure to identify the padding area within the input frame by traversing the input frame in a row-wise and column-wise. The at least one processor may be configure to obtain information associated with the scale of the image area, the scale of the input frame, the scale of the padding area and the input frame. The at least one processor may be configure to remove the padding area within the input frame based on the information.

In an embodiment, a machine-readable medium containing instruction that when executed cause at least one processor of an electronic device to obtain an input frame. The at least one processor may be configure to build at least one kernel independent of the scale of the input frame by passing input variables to the at least one kernel using preprocessor directives independent of the scale of the input frame. The at least one processor may be configure to input the input frame to the AI model including the at least one kernel independent of the scale of the input frame. The at least one processor may be configure to process the input frame in the AI model.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

In an embodiment, a method for in-place transformation of an input image for an on-device artificial intelligence (AI) model by an electronic device is provided. The method may include receiving, by the electronic device, the input image. The method may include detecting, by the electronic device, at least one region of interest (RoI) in the input image, wherein the at least one RoI is in a first scale. The method may include initiating, by the electronic device, the on-device AI model to process the input image. The method may include detecting, by the electronic device, a change in the first scale of the at least one RoI to a second scale. The method may include detecting, by the electronic device, a size of the at least one ROI. The method may include transforming, by the electronic device, the at least one RoI from the first scale to the second scale by reducing the size of the at least one RoI. The method may include inputting, by the electronic device, the at least one transformed RoI to the on-device AI model for image processing. The at least one transformed RoI is inputted to the on-device AI model without reinitializing and re-caching the on-device AI model.

In an embodiment, the method may include activating, by the electronic device, at least one kernel of the on-device AI model on the at least one transformed RoI of the image for image processing. The method may include generating, by the electronic device, an output image with processed regions of the at least one transformed RoI of the image.

In an embodiment, the method may include determining, by the electronic device, whether at least one of a zoom event, a change in aspect ratio of the at least one RoI of the image, a change in orientation of the at least one RoI of the image, a change in resolution of the at least one RoI of the image, and a change in at least one ROI in the at least one RoI of the image. the method may include detecting, by the electronic device, the change in the first scale of the at least one RoI to the second scale in response to detecting at least one of the zoom event, the change in aspect ratio of the at least one RoI of the image, the change in orientation of the at least one RoI of the image, the change in resolution of the at least one RoI of the image, and the change in the at least one ROI in the at least one RoI of the image.

In an embodiment, the method may include detecting, by the electronic device, at least one of zero padded area or an area without pixels in the at least one RoI of a first area. The method may include transforming, by the electronic device, the at least one RoI from the first scale to the second scale by removing at last one of the zero padded area or the area without pixels in the at least one RoI.

In an embodiment, the method may include determining, by the electronic device, area corresponding to the at least one ROI in the at least one transformed RoI of the image. The method may include activating, by the electronic device, the at least one kernel of the on-device AI model on the area corresponding to the at least one ROI in the at least one transformed RoI of the image.

In an embodiment, the method may include determining, by the electronic device, whether at least one pixel part of the at least one ROI. The method may include performing, by the electronic device, one of performing regular convolution operation or pool operations in response to determining that the at least one pixel is not part of the at least one ROI, and copying the at least one pixel in response to determining that the at least one pixel is part of the at least one ROI. The method may include generating, by the electronic device, the output image, wherein the output image comprise the processed regions returned to locations of the at least one ROI based on spatial changes.

In an embodiment, an electronic device for in-place transformation of an input image for an on-device AI model by electronic device is provided. The electronic device may include a memory, at least one processor, and an at least one processor, communicatively coupled to the memory and the at least one processor. The at least one processor may be configured to receive the image. The at least one processor may be configured to detect at least one region of interest (RoI) in the input image, wherein the at least one RoI is in a first scale. The at least one processor may be configured to initiate the on-device AI model configured to process the input image. The at least one processor may be configured to detect a change in the first scale of the at least one RoI to a second scale. The at least one processor may be configured to detect a size of the at least one ROI. The at least one processor may be configured to transform the at least one RoI from the first scale to the second scale by reducing the size of the at least one RoI. The at least one processor may be configured to input the at least one transformed RoI to the on-device AI model for image processing, wherein the at least one transformed RoI is inputted to the on-device AI model without reinitializing and re-caching the on-device AI model.

In an embodiment, the at least one processor may be configured to activate at least one kernel of the on-device AI model on the at least one transformed RoI of the image for image processing. The at least one processor may be configured to generate an output image with processed regions of the at least one transformed RoI of the image.

In an embodiment, the at least one processor may be configured to activate determine whether at least one of a zoom event, a change in aspect ratio of the at least one RoI of the image, a change in orientation of the at least one RoI of the image, a change in resolution of the at least one RoI of the image, and a change in at least one ROI in the at least one RoI of the image. The at least one processor may be configured to detect the change in the first scale of the at least one RoI to the second scale in response to detecting at least one of the zoom event, the change in aspect ratio of the at least one RoI of the image, the change in orientation of the at least one RoI of the image, the change in resolution of the at least one RoI of the image, and the change in the at least one ROI in the at least one RoI of the image.

In an embodiment, the at least one processor may be configured to detect at least one of a zero padded area or an area without pixels in the at least one RoI of a first area. The at least one processor may be configured to transform the at least one RoI from the first scale to the second scale by removing at least one of the zero padded area or the area without pixels in the at least one RoI.

In an embodiment, the at least one processor may be configured to determine area corresponding to at least one ROI in the at least one transformed RoI of the image. The at least one processor may be configured to activate the at least one kernel of the on-device AI model on the area corresponding to at least one ROI in the at least one transformed RoI of the image.

In an embodiment, the at least one processor may be configured to determine whether at least one pixel part of the at least one ROI. The at least one processor may be configured to perform one of perform regular convolution operation or pool operations in response to determining that the at least one pixel is not part of the at least one ROI, and copy the at least one pixel in response to determining that the at least one pixel is part of the at least one ROI. The at least one processor may be configured to generate the output image, wherein the output image comprise the processed regions returned to locations of the at least one ROI based on spatial changes.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for in-place transformation of an input frame for an on-device artificial intelligence (AI) model, the method comprising:
    obtaining an input frame;
    building at least one kernel independent of a scale of the input frame by passing input variables to the at least one kernel using preprocessor directives independent of the scale of the input frame;
    inputting the input frame to the on-device AI model including the at least one kernel independent of the scale of the input frame; and
    processing the input frame in the on-device AI model, wherein the processing of the input frame comprises:
        performing neural network operation, including convolution operation or pooling operation, for a region identified as at least one region of interest (RoI) within the input frame;
        copying the region identified as a non-RoI representing the remaining region of the at least one RoI within the input frame; and
        generating an output image based on the performing of the neural network operation for the region identified as the at least one RoI and the copying of the region identified as the non-RoI.

2. The method of claim 1, wherein the processing of the input frame comprises:
    identifying at least one region of interest (the at least one RoI) including at least one pixel included in the input frame.

3. The method of claim 2, wherein the identifying of the at least one RoI comprises:
    obtaining a remaining region after removing a padding area in the input frame as RoI; or
    obtaining at least one region designated by a user as at least one RoI based on a user input including information on the region designated by the user.

4. The method of claim 2, wherein the identifying of the at least one RoI comprises:

obtaining a residual frame representing a difference between the input frame included in successive frames and a previous frame of the input frame as the at least one RoI.

5. The method of claim 1, wherein the generating of the output image comprises:
    obtaining the at least one RoI by performing the neural network operation for the region identified as the at least one RoI within the input frame; and
    returning the at least one RoI to expected location in an output frame taking into account spatial changes.

6. The method of claim 5, wherein the obtaining of a remaining region after removing a padding area in the input frame as RoI comprises:
    identifying the padding area within the input frame by traversing the input frame in a row-wise and column-wise;
    obtaining information associated with the scale of an image area, the scale of the input frame, the scale of the padding area and the input frame; and
    removing the padding area within the input frame based on the information.

7. An electronic device for in-place transformation of an input image for an on-device artificial intelligence (AI) model by the electronic device, the electronic device comprises:
    a memory, comprising one or more storage media, storing instructions; and
    at least one processor communicatively coupled to the memory,
    wherein the instructions, when executed by the at least one processor individually or collectively, cause the electronic device to:
    obtain an input frame,
    build at least one kernel independent of a scale of the input frame by passing input variables to the at least one kernel using preprocessor directives independent of the scale of the input frame,
    input the input frame to the on-device AI model including the at least one kernel independent of the scale of the input frame, and
    process the input frame in the on-device AI model,
    wherein the at least one processor is further configured to:
        perform neural network operation, including convolution operation or pooling operation, for a region identified as at least one region of interest (RoI) within the input frame,
        copy the region identified as a non-RoI representing the remaining region of the at least one RoI within the input frame, and
        generate an output image based on the performing of the neural network operation for the region identified as the at least one RoI and the copying of the region identified as the non-RoI.

8. The electronic device of claim 7, wherein the at least one processor is further configured to:
    identify the at least one RoI including at least one pixel included in the input frame.

9. The electronic device of claim 8, wherein the at least one processor is further configured to:
    obtain a remaining region after removing a padding area in the input frame as RoI, or
    obtain at least one region designated by a user as the at least one RoI based on a user input including information on the region designated by the user.

10. The electronic device of claim 8, wherein the at least one processor is further configured to:

obtain a residual frame representing a difference between the input frame included in successive frames and a previous frame of the input frame as the at least one RoI.

11. The electronic device of claim 7, wherein the at least one processor is further configured to:
 obtain the at least one RoI by performing the neural network operation for the region identified as the at least one RoI within the input frame, and
 return the at least one RoI to expected location in an output frame taking into account spatial changes.

12. The electronic device of claim 11, wherein the at least one processor is further configured to:
 identify a padding area within the input frame by traversing the input frame in a row-wise and column-wise,
 obtain information associated with the scale of an image area, the scale of the input frame, the scale of the padding area and the input frame, and
 remove the padding area within the input frame based on the information.

13. One or more non-transitory machine-readable media storing media storing one or more computer programs including computer-executable instructions that, when executed at least one processor of an electronic device individually or collectively cause the electronic device to perform operations, the operations comprising to:
 obtaining an input frame,
 building at least one kernel independent of the a scale of the input frame by passing input variables to the at least one kernel using preprocessor directives independent of the scale of the input frame,
 inputting the input frame to an on-device artificial intelligence (AI) model including the at least one kernel independent of the scale of the input frame, and
 processing the input frame in the on-device AI model,
 wherein the operations further comprising:
  performing neural network operation, including convolution operation or pooling operation, for a region identified as at least one region of interest (RoI) within the input frame,
  copying the region identified as a non-RoI representing the remaining region of at least one RoI within the input frame, and
  generating an output image based on the performing of the neural network operation for the region identified as the at least one RoI and the copying of the region identified as the non-RoI.

14. The one or more non-transitory machine-readable media of claim 13, wherein the operations further comprising:
 identifying the at least one RoI including at least one pixel included in the input frame.

15. The one or more non-transitory machine-readable media of claim 13, wherein the operations further comprising:
 obtaining a remaining region after removing the a padding area in the input frame as RoI, or
 obtaining at least one region designated by a user as the at least one RoI based on a user input including information on the region designated by the user.

16. The one or more non-transitory machine-readable media of claim 13, wherein the operations further comprising:
 obtaining a residual frame representing a difference between the input frame included in successive frames and a previous frame of the input frame as at least one region of interest (RoI).

17. The one or more non-transitory machine-readable media of claim 13, wherein the operations further comprising:
 obtaining at least one region of interest (RoI) by performing a neural network operation for a region identified as the at least one RoI within the input frame, and
 returning the at least one RoI to expected location in an output frame taking into account spatial changes.

\* \* \* \* \*